(12) United States Patent
Lindloff

(10) Patent No.: US 8,267,613 B2
(45) Date of Patent: Sep. 18, 2012

(54) QUICK RELEASE LATCH ASSEMBLY

(75) Inventor: Christopher D. Lindloff, New Richmond, WI (US)

(73) Assignee: Kuryakyn Holdings, LLC, Somerset, WI (US)

( * ) Notice: Subject to any disclaimer, the term of this patent is extended or adjusted under 35 U.S.C. 154(b) by 229 days.

(21) Appl. No.: 12/657,693

(22) Filed: Jan. 26, 2010

(65) Prior Publication Data

US 2011/0182658 A1 Jul. 28, 2011

(51) Int. Cl.
*B25G 3/12* (2006.01)
(52) U.S. Cl. .......... 403/322.4; 403/82; 403/325
(58) Field of Classification Search ............ 403/82, 403/87, 98, 116, 117, 322.1, 322.4, 324, 403/325, DIG. 4; 16/321, 324, 326; 248/503.1; 224/413, 423; 280/202; 297/378.13, 336
See application file for complete search history.

(56) References Cited

U.S. PATENT DOCUMENTS

| | | | |
|---|---|---|---|
| 4,692,049 A * | 9/1987 | Engle | 403/1 |
| 4,747,612 A * | 5/1988 | Kuhn | 172/275 |
| 4,759,580 A | 7/1988 | Berklich, Jr. et al. | |
| 4,773,693 A | 9/1988 | Premji et al. | |
| 4,993,731 A | 2/1991 | Fuller | |
| 5,664,715 A | 9/1997 | Gogan et al. | |
| 5,667,232 A * | 9/1997 | Gogan et al. | 280/202 |
| 6,007,150 A * | 12/1999 | Clerkin et al. | 297/215.12 |
| 6,347,804 B1 * | 2/2002 | Seibel | 280/288.4 |
| 6,383,156 B1 * | 5/2002 | Enzerink et al. | 602/16 |
| 6,443,344 B1 | 9/2002 | Nicosia et al. | |
| 6,648,408 B1 * | 11/2003 | Grove | 297/195.13 |
| 6,729,515 B2 | 5/2004 | Nicosia et al. | |
| 6,840,704 B1 * | 1/2005 | Monson | 403/325 |
| 7,367,745 B2 * | 5/2008 | Lu | 403/321 |
| 7,654,496 B2 * | 2/2010 | Sharpe et al. | 248/222.11 |
| 7,946,632 B1 * | 5/2011 | Mueller | 292/1 |

* cited by examiner

*Primary Examiner* — Joshua Kennedy

(74) *Attorney, Agent, or Firm* — Dicke, Billig & Czaja, PLLC

(57) ABSTRACT

A quick-release latch assembly includes a plate, a latch pivotally coupled to the plate, and a locking assembly movable relative to the latch between a first, unlocked position and a second, locked position. When the locking assembly is in the unlocked position, the latch is allowed to rotate with respect to the plate. In contrast, when the locking assembly is in the locked position, the latch is prevented from rotating with respect to the plate.

4 Claims, 2 Drawing Sheets

QUICK RELEASE LATCH ASSEMBLY

BACKGROUND

Various types of accessories can be mounted on a motorcycle to provide customization of the motorcycle for enhanced functionality, experience and/or aesthetics of the motorcycle. One type of accessory is known as a sissy bar, which comprises a backrest mounted to the motorcycle. To reversibly mount accessories such as a sissy bar to the motorcycle, a mounting assembly is used to secure the accessory to one or more docking points positioned on opposite sides of the motorcycle. One example of such a mounting assembly is described in U.S. Pat. No. 5,667,232. Such a mounting assembly includes opposed side plates that are secured relative to the docking points and coupled to the accessory. There is a need for a mounting assembly that is easily mountable and securely connectable to known docking points on a motorcycle.

SUMMARY

A quick-release latch assembly is disclosed that includes a plate, a latch pivotally coupled to the plate, and a locking assembly movable relative to the latch between a first, unlocked position and a second, locked position. When the locking assembly is in the unlocked position, the latch is allowed to rotate with respect to the plate. In contrast, when the locking assembly is in the locked position, the latch is prevented from rotating with respect to the plate.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
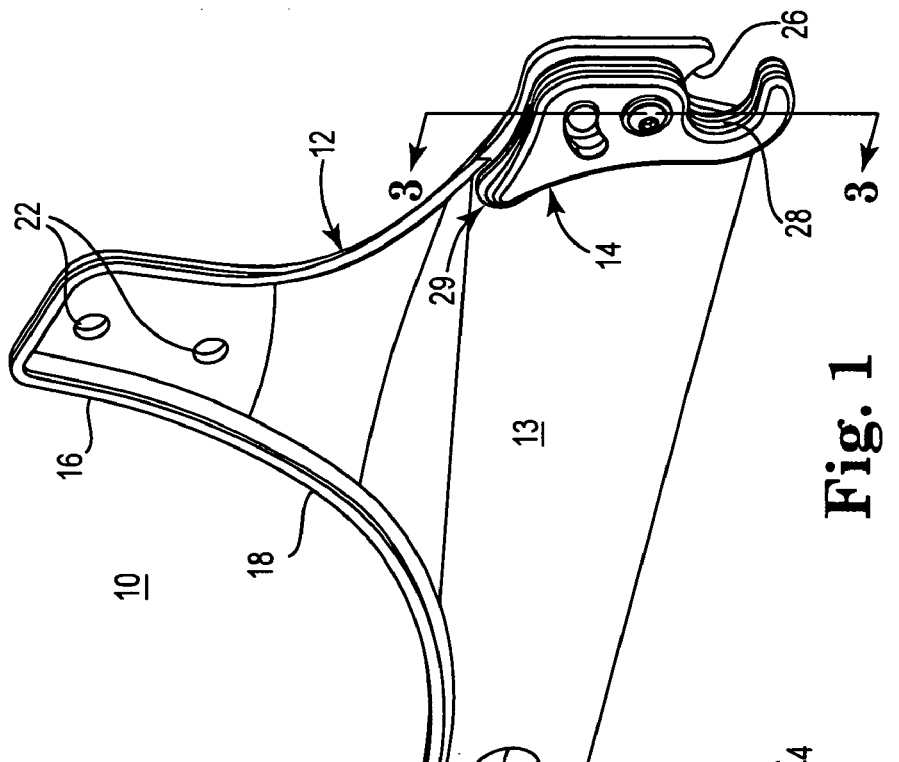
FIG. 1 is a perspective view of a quick-release latch assembly of the present invention.

FIG. 1 illustrates a perspective view of a quick-release latch assembly 10 configured to be mounted on existing docking points of a motorcycle or similar structure such as shown and described in U.S. Pat. No. 5,667,232, the contents of which are incorporated herein by reference. In one embodiment, a similar corresponding quick-release latch assembly is spaced apart from assembly 10 and mounted on an opposite side of the motorcycle. The assemblies are mounted to an accessory such as a sissy bar, luggage rack, etc. Assembly 10 includes a side plate 12 and a latch 14 rotatable with respect to the side plate 12. As shown in FIG. 1, side plate 12 has a surface 13 that faces a motorcycle when quick-release latch assembly 10 is in use. As discussed below, latch 14 can rotate between a first, open position and a second, closed position (as shown in FIG. 1). In the open position, latch 14 is freely rotatable with respect to side plate 12. In the closed position, latch 14 is locked with respect to side plate 12 such that rotation of the latch 14 relative to the plate 12 is prevented.

Side plate 12 includes at least one accessory mounting section 16, an intermediate section 18 and a lower section 20. Section 16 includes a plurality of mounting apertures 22 adapted to receive fasteners of an accessory such as a sissy bar. Alternatively, an accessory may be integrally connected to section 16, such as by welding. Intermediate section 18 couples section 16 to the lower section 20 and, in one embodiment, can be obliquely oriented with respect to the section 16 and lower section 20 as desired so as to accommodate latch 14 being positioned on an interior side of plate 12. Lower section 20 includes a first c-shaped receiving portion 24 and a second curved receiving portion 26 positioned at either end of the lower section 20. Receiving portions 24 and 26 are shaped so as to receive docking points, i.e., a mounting boss or stud, mounted on a motorcycle. In one embodiment, the docking points are cylindrically shaped.

As detailed below, in order to secure assembly 10 to a motorcycle, latch 14 includes a corresponding hook portion 28 that cooperates with receiving portion 26 to sufficiently surround the docking point to lock assembly 10 with respect to docking points of the motorcycle. In order to lock assembly 10 to the docking points, latch 14 is moved to the open position, wherein hook portion 28 is rotated to a position away from receiving portion 26 such that the docking point can enter receiving portion 26 without interference from hook portion 28. Side plate 12 is then positioned (e.g., tilted in a downward direction) such that a first docking point (not shown) is positioned within receiving portion 24. Then, side plate 12 is pivoted about the first docking point such that a second docking point (not shown) enters into receiving portion 26. Latch 14 is then rotated in order to move latch 14 from the open position to the closed position as illustrated in FIG. 1. To facilitate rotation of latch 14, in one embodiment latch 14 may include a finger 29 at an end of latch 14 opposite hook portion 28. After rotation of latch 14 to the closed position, the second docking point is secured between receiving portion 26 and hook portion 28.

Figure 2:
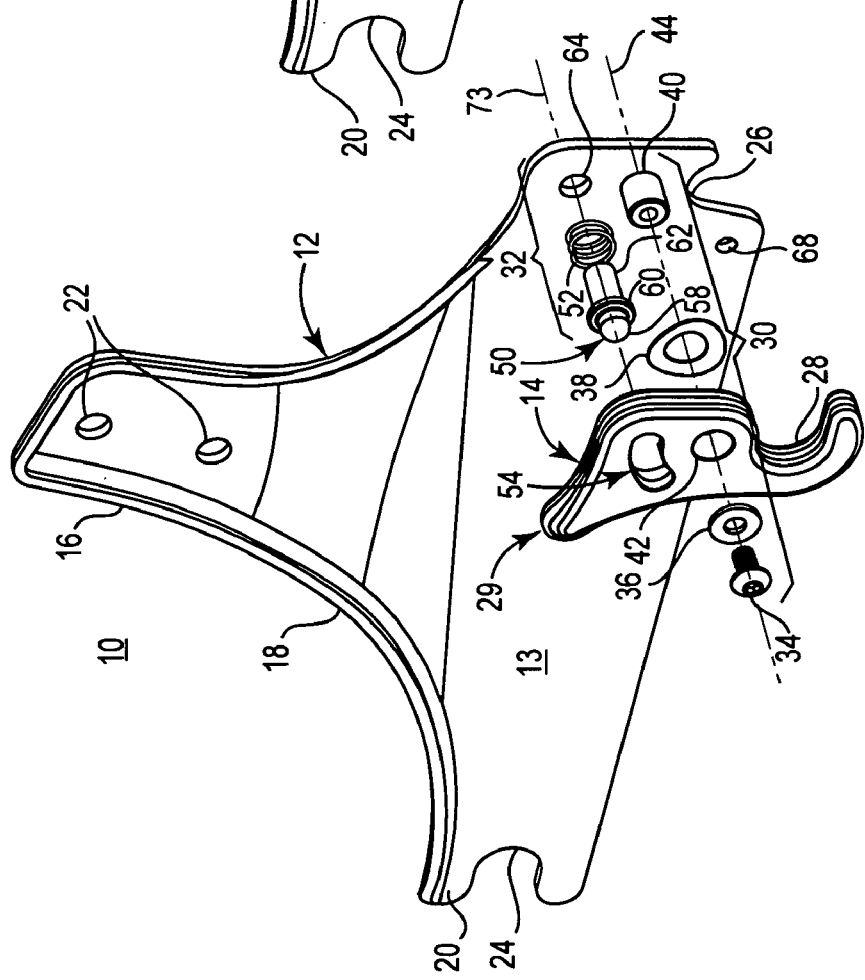
FIG. 2 is an exploded perspective view of the quick-release latch assembly of FIG. 1.

With further reference to FIG. 2, in one embodiment, latch 14 is pivotally coupled to side 13 of side plate 12 through a pivot assembly 30. Additionally, a locking assembly 32 is coupled to side plate 12 and latch 14 and configured to allow rotation of latch 14 with respect to side plate 12 in the open position and prevent rotation of latch 14 with respect to side plate 12 in the closed position. The locking assembly 32 cooperates with latch 14 and is movable between a first, unlocked position when latch 14 is in the open position and a second, locked position when latch 14 is in the closed position. In particular, the locking assembly 32 moves from a retracted position within plate 12 to an extended position in plate 12, as discussed below.

Figure 3:
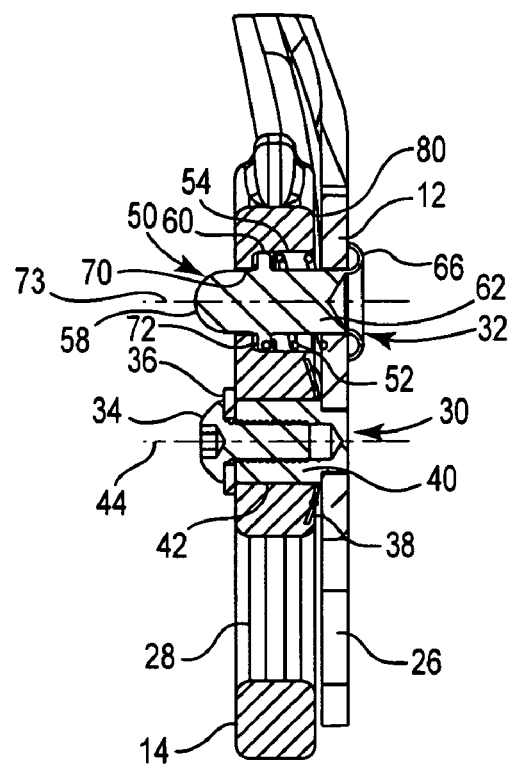
FIG. 3 is a sectional view taken along line 3-3 in FIG. 1.

With further reference to FIG. 3, pivot assembly 30 includes a fastener 34, exterior washer 36, spring washer 38 and a pivot pin 40. Latch 14 includes a corresponding aperture 42, generally located midway between finger 29 and hook portion 28, to receive pivot pin 40. In order to secure latch 14 to side plate 12, pivot pin 40 is attached to side plate 12. In one embodiment, pivot pin 40 is welded to side plate 12. Spring washer 38 is positioned around pivot pin 40 and aperture 42 of latch 14 is positioned about pivot pin 40. Fastener 34 is inserted through washer 36, aperture 42, spring washer 38 and into pivot pin 40, which includes internal threads that receive external threads of fastener 34. Spring washer 38 is provided to bias latch 14 away from side plate 12 and against fastener 34 so as to provide clearance for latch 14 to rotate with respect to side plate 12 about a pivot axis 44.

Locking assembly 32 includes a push button 50 and a spring 52 that act together to cooperate with an arcuate slot 54 of latch 14, which in one embodiment is generally located between finger 29 and aperture 42. Button 50 includes a top portion 58, an intermediate collar portion 60 and a lower portion 62. A corresponding aperture 64 is provided on side plate 12 to receive and allow movement of lower portion 62 of button 50. To secure locking assembly 32 to side plate 12, spring 52 is positioned around lower portion 62 of button 50. Lower portion 62 of button 50 is then inserted through aperture 64 and an end of button 50 is deformed (i.e., expanded) so as to form a tail 66 (FIG. 3). Tail 66 is formed at a position such that button 50 is movable with respect to plate 12. In an alternative embodiment, lower portion 62 can include internal threads to receive external threads of a corresponding fastener. If desired, an aperture 68 is provided in lower section 20 of side plate 12 to receive a pin lock or other mechanism that prevents rotation of latch 14 with respect to side plate 12 and prevents unwanted removal of assembly 10 from the motorcycle when latch 14 is in the closed position.

Figure 4:
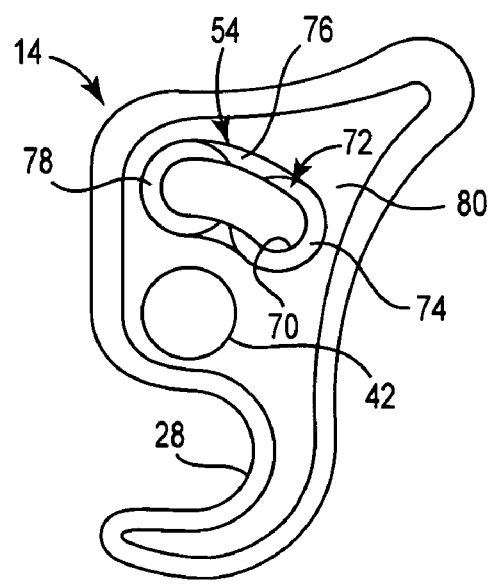
FIG. 4 is a top view of a side of a latch of the quick-release latch assembly of FIG. 1 that faces a side plate of such an assembly.

FIG. 4 is a top view of an interior surface 80 of latch 14 that faces side 13 of side plate 12. With further reference to FIG. 4, slot 54 includes an arcuate aperture 70 and a shoulder 72 recessed relative to the interior surface 80 of latch 14. Spring 52 biases button 50 such that collar 60 contacts shoulder 72 and moves button 50 between a first, retracted position and a second, extended position along a locking axis 73 generally parallel to pivot axis 44. In particular, shoulder 72 includes a pocket portion 74, a ramp portion 76 and a locking portion 78. Shoulder 72 is sized to accommodate collar 60 of button 50 such that top portion 58 of button 50 extends through aperture 70 and collar 60 is pressed against shoulder 72 due to bias of spring 52 urging collar 60 away from side plate 12. In one embodiment, pocket portion 74 of shoulder 72 is formed at a first depth from surface 80 and is sized to accommodate a circumference of collar 60. Ramp portion 76 gradually increases in depth from pocket portion 74 to locking portion 78. Locking portion 78 is recessed at a further depth than ramp portion 76 to receive collar 60 when locking assembly 32 is in the locked position. In one embodiment, locking portion 78 is recessed from ramp portion 76 at a depth corresponding to the thickness of collar 60.

When latch 14 is in the open position, collar 60 is positioned within pocket portion 74, which forms a detent to accommodate collar 60 and prevent further rotation of latch 14 past the open position. Coincidentally, button 50 is in the retracted position, wherein collar 60 is positioned closer to side plate 12 along axis 73. As latch 14 is rotated to the closed position, collar 60 travels along ramp portion 76 and ultimately registers within locking portion 78. As locking portion 78 is recessed to a greater depth (e.g., approximately a distance corresponding to the thickness of collar 60) than ramp portion 76, collar 60 is urged against locking portion 78. This in turn causes button 50 to move to the extended position, wherein collar 60 is further away from plate 12 along axis 73 (as shown in FIG. 3). Locking portion 78 is sized and shaped to match the size and shape of collar 60 so as to prevent movement of collar 60 with respect to latch 14 and thus preventing latch 14 from rotation with respect to side plate 12. As illustrated, both collar 60 and locking portion 78 are generally circular in shape, although other shapes can be used.

In order to release collar 60 from locking portion 78, top portion 58 of button 50 is depressed so as to slide button 50 with respect to plate 12 to the retracted position along axis 73. This sliding movement moves collar 60 out of locking portion 78 such that latch 14 can be rotated with respect to plate 12 and collar 60 moves back along ramp portion 76 and back into pocket portion 74.

Thus, locking assembly 32, button 50 and collar 60 cooperate with latch 14 to move to different positions depending on whether latch 14 is in the open position or the closed position. When in the open position, collar 60 is positioned in pocket portion 74 and when latch 14 is in the closed position, collar 60 is positioned in locking portion 78. Coincidentally, button 50 moves from the retracted position (i.e., collar 60 is closer to plate 12) when latch 14 is in the open position to the extended position (i.e., collar 60 is further away from plate 12) when latch 14 is in the closed position. In particular, the following table illustrates respective positions of locking assembly 32, button 50 and collar 60 depending on whether latch 14 is in the open position or the closed position:

| Element | When Latch 14 is in Open Position | When Latch 14 is in Closed Position |
| --- | --- | --- |
| locking assembly 32 | unlocked position | locked position |
| button 50 | retracted position along axis 73 | extended position along axis 73 |
| collar 60 | within pocket portion 74 | within locking portion 78 |

The quick-release latch assembly of the present invention provides a simple and secure means for connecting various motorcycle accessories to existing docking points on a motorcycle. The latch is readily pivotable from an open position to a closed position when the side plate receiving portions are engaged with the docking points. The locking assembly automatically secures the latch in the closed position to keep the accessory stably and reliably connected to the motorcycle. Intentional manual compression of the push button is required before the latch can pivot away from the closed position.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. In particular, it is not critical that latch 14 be mounted to surface 13 of side plate 12, and in an alternate embodiment, latch 14 is mounted to the opposite surface of side plate 12 in the same manner described herein with respect to surface 13. Therefore, it is intended that this invention be limited only by the claims and the equivalents thereof.

What is claimed is:

1. A latch assembly for a motorcycle accessory mounting apparatus comprising:
    a plate;
    a latch coupled to the plate about a pivot axis, the latch including an arcuate slot between a first side and a second side of the latch adjacent to the pivot axis, wherein the first side faces the plate, and wherein the first side at each end of the arcuate slot is configured with a recess; and
    a pin having a first end engaging the plate and a second end extending into the arcuate slot and a collar therebetween, the second end of the pin defining a range of a pivotal movement of the latch between a closed position and an open position, the pin collar configured to fit in each recess of the latch, the pin collar being biased toward the latch and movable away from the latch, wherein the latch is secured from pivotal movement when the pin collar is in either one of the recesses.

2. The latch assembly of claim 1, wherein the latch further includes a hook portion and the plate includes a receiving portion cooperating with the hook portion to secure a docking point therebetween when the latch is in the closed position.

3. The latch assembly of claim 1, further comprising:
    a fastener for coupling the latch to the plate; and
    a biasing member urging the latch away from the plate.

4. The latch assembly of claim 1, wherein the first end of the pin extends through an aperture in the plate.

* * * * *